United States Patent Office 3,222,489
Patented Dec. 7, 1965

3,222,489
PROCESS FOR INHIBITION OF ELECTRICAL-CONTACT FAILURE
Saul W. Chaikin, Palo Alto, Calif., assignor to Stanford Research Institute, Menlo Park, Calif., a corporation of California
No Drawing. Filed May 4, 1964, Ser. No. 364,814
8 Claims. (Cl. 200—166)

The present invention relates to electric contacts, and more particularly to electric contacts which are used to make frequent interruptions in electric circuits.

In one of its most specific embodiments, the invention pertains to sealed relays, and to the inhibitions of failures in such relays, which failures are presumably caused, or at least aggravated by the presence in said sealed relays of organic contaminants.

Electric contacts which are caused to make and break contacts frequently, are subjected to severe operating conditions. Thus, relays, potentiometers, commutators, and cable connectors are illustrative examples of electric connecting or contact devices in which contact contamination can and does frequently cause electrical contact failures. The problem is intensified by the growing use of equipment which must operate dependably in low signal level systems as well as in systems which operate, whether continuously or with intervening lengthy storage periods, at moderate signal levels. One such system in which repeated and/or continuous operation has been found to cause electrical-contact failure presumably at least in part due to contact surface contamination comprises the miniature and subminiature sealed relays, such as those employed in telephone communication systems.

Without any intention of being limited by any theory, it is presently believed that organic insulations and other plastic relay parts within the sealed relays (or like electric contact devices) evolve organic, and possibly hydrocarbon gases or vapors, which apparently react with the contact metals to produce a non-conducting deposit on the contact surfaces. One such non-conducting deposit is the organic deposit, called frictional polymer, which forms at the rubbing site within a sealed relay. Such a frictional polymer is especially formed in sealed relays in which the contacts are made of, or at least coated with metals of the platinum family, e.g., platinum, palladium.

The formation of the aforementioned frictional polymer has been found to occur at the rubbing sites when the mentioned metals of the platinum family are rubbed together, e.g., is the manner in which contacts are made and broken in sealed relays, in the presence of organic vapors, much as those produced or evolved in sealed relays by organic insulations or parts used in sealed relays. Again, without being limited to any theory, it is presently the inventor's opinion that the rubbing of the metal surface in a sealed relay, or the like, possibly causes emission of electrons from and by the metal surfaces, and that these electrons probably cause chemical changes in the hydrocarbons in the vincinity. Since at least some, if not all of the metals of the platinum family are catalysts capable of causing reactions in organic compounds, it is believed that the frictional polymer is quite likely produced (in the sealed relays and the like) by some combination of the effects of catalysts and of electron emission from the rubbed surfaces in the sealed contact-producing devices which have the rubbing metals surrounded by (and therefore in contact with) gases or vapors evolved by organic insulators, etc. Whatever might be the theory, the fact remains that the aforementioned connecting devices, e.g., sealed relays using contacts of metals of the platinum family do generate organic contaminants which cause electrical-contact failures. Also, various methods and means heretofore proposed to overcome this difficulty have been insufficient, uneconomical and/or impractical.

It is therefore an object of the present invention to avoid the above and other defects, and to provide a method and means to inhibit contaminations of (and therefore electrical-contact failure in) electrical connecting devices of the type of sealed relays, commutators, and the like. It is a further object of this invention to inhibit the formation of the so-called frictional polymers in sealed connecting devices, e.g., sealed relays, while frictional polymers, as previously indicated are produced in such sealed devices wherein metals of the platinum family are employed to make the moving (e.g., sliding) parts. It is still another object to provide means for inhibiting the polymerizations, in sealed relays, of organic gases or vapors, e.g., hydrocarbon vapors, which are present in said sealed relays by being formed or evolved from plastic relay parts and other organic insulators in the relays, said polymers causing excessive reistance and therefore failure of the contact devices.

It has now been discovered that the above and other objects may be attained by providing the space surrounding the contact elements (specifically, the contact members made of or coated with metals of the platinum family) with certain compounds having definite and specific characteristics. Generally speaking, these compounds comprise substances which are in the form of free radicals or which yield free radicals under the conditions existing in the space immediately surrounding the metal contacts of the contacting devices.

The form "free radical," as employed herein, refers to an organic compound in which all of the valences are not satisfied (see: Hackh's Chemical Dictionary, 3rd ed.). These free radicals are electrically neutral molecules possessing one unpaired electron and exhibiting an unsaturated behavior. These properties distinguish these free radicals from ions, such as those obtained by ionization of certain salts or in electric discharges in gases.

As stated, all compounds which exist in the form of three radicals or which yield free radicals under the conditions, existing in the vapor space surrounding the metal contacts of a sealed relay or like sealed contacting device. Broadly stated, the substances which are suitable as vapor phase inhibitors in sealed contacting devices comprise the organo-metallic compounds and the organic free radical compounds. The former class comprises substances which yield free radicals under the operating conditions existing in the sealed contacting device (e.g., sealed relay), while the second group comprises compounds which exist as or readily dissociate into free radicals.

Representative compounds which exist in the form of free radicals are the substances containing trivalent carbon, as triaryl methyls of the type of triphenyl methyl, and trialkyl methyls of the triethyl methyl, compounds which contain bivalent and quadrivalent nitrogen, compounds containing univalent oxygen or sulfur, and the like. A more complete list of such organic free radical compounds is to be found in the 1943 (2nd edition) of "Organic Chemistry—An Advanced Treatise," by H. Gilman and others, vol. I, pages 582–630.

It was found that organo-metallic compounds are highly suitable for inhibiting the formation of organic friction polymers, and particularly hydrocarbyl polymers, in sealed relays, and like sealed contacting devices in which the metal moving members comprise or consist of metals of the platinum family. Without any intentions of being limited by the compounds enumerated herein, it may be stated that representative compounds of this class or group include substances of the type of tetraethyl lead, tetramethyl lead, tetraphenyl lead, tetraethyl tin, dimethyl-diethyl tin, tetramethyl tin, trimethyl-ethyl tin, tetraethyl germanium, diphenyl germanium, di- and trivalent organo-tin compounds of both the aliphatic and aromatic series, as triphenyl tin and diethyl tin, organo-lead compounds containing di- and trivalent lead, and the like and their homologues and analogues. It is generally preferred to select and use those organo-metallic compounds which provide a sufficiently high concentration of the organo-metallic compound and of the free radicals produced by it at the temperatures and pressures existing in the sealed space surrounding the metal contacts of the contacting devices to be processed according to the process of the present invention. At least in part, the concentration of the free radicals (or of its precursors) in the vapor phase of the sealed relay will depend on the concentration of the organic, polymer-forming material, e.g., hydrocarbon in said vapor phase.

Although the above organo-metallic compounds cover substances in which a carbon atom of the organic radical is united directly to a metal atom of the fourth group of the Periodic Table, it is to be understood that organo-metallic compounds containing metals of other groups are also suitable polymerization inhibitors. Thus, dimethyl cadmium, dipropyl cadmium, trimethyl lanthanum, trimethyl bismuth, and similar compounds may be employed as inhibitors of the present invention. In fact, a description of organo-metallic compounds (suitable as such inhibitors) may be found on pages 489–580 of the above-mentioned 1943 edition of Gilman's "Organic Chemistry—An Advanced Treatise."

It has been indicated above that the amount of the free radicals substance (or of the precursors thereof, e.g., the organo-metallic compounds), which is to be used, in accordance with the process of the present invention, to inhibit polymer formation in the sealed electric contact devices, such as sealed relays, may vary within rather wide limits, and may at least in part depend on the particular inhibiting compound or substance employed, the type and concentration of the organic, polymer-forming substances in the sealed-in space, as well as the operating conditions, i.e., temperature, pressure, etc., therein. Thus, it was found that, other conditions being equal, greater and longer inhibition (as well as total suppression) of frictional polymer formation can be attained by increasing the concentration of the particular organo-metallic compound, e.g., tetraethyl lead, in the vapor space of a sealed electric contact device. Also, as will be brought out hereinbelow in connection with the description of the illustrative experimental results, the use of optimum amounts of organo-metallic compounds not only inhibits polymer formation from the organic (e.g., hydrocarbyl) compounds present in the vapor space, but also permits good lubrication of the electric contacts, thus inhibiting not only polymer formation, but also wear of the contacts, which latter, as previously indicated consist of or are at least coated with metals of the platinum family, i.e., platinum, iridium, osmium, palladium, rhodium, and ruthenium.

The invention is illustrated by the following examples which are presented herein for the purpose of showing the advantages derived from operating in accordance with the process of the present invention, and the results obtained thereby. It is understood, however, that these examples are merely illustrative of the invention and are not to be considered as limiting the invention in any sense.

*Example I*

In this example, as well as in the other illustrative examples described hereinbelow, a sealed electric contact device of the type of a commutator or relay was simulated by providing a sealable tubular apparatus in which a palladium stylus was caused to rub against a palladium plate under controlled force. Both the rubbing and the application of force were accomplished with electromagnets, the former with an A.C. field at 18 cycles per second, and the latter with a D.C. field. A standard 2-hour rubbing period and a contact force of 10 grams were employed.

In the instant case, a standard atmosphere of saturated benzene vapor was produced within the sealed apparatus by introducing and keeping therein (throughout the experiment) a dish of benzene. At the conclusion of a 2-hour rubbing, the wear track on the palladium plate was found to be covered with a dark deposit. In order to compare the various deposits made under different conditions, they were rated visually, the heaviest deposits being rated by "10" while "0" being assigned to a case where no or substantially no deposit was formed. In the experiment just described, the dark deposit (being quite heavy), its relative quantity was equal to "10," 90% of this product comprising or consisting of the aforementioned organic product formed by the polymerization of the benzene at the wear surface.

When the above run was repeated with the same benzene atmosphere but having organic-metallic compounds present in the sealed container, the results obtained were as follows:

| Inhibitor: | Relative quantity of product (heaviest=10) |
|---|---|
| Tetraethyl lead | 8 |
| Tetraethyl tin | 2 |
| Dimethyl mercury | 4 |

In this connection it must be noted that in the case of the run in which tetraethyl lead was used, the deposit found contained substantially no organic frictional polymer, but consisted substantially exclusively of a product formed by the wear of the metal (i.e., palladium) subjected to frictional contact.

*Example II*

A series of runs similar to those described above were made to determine the effect which will be obtained when the concentration of the free-radical-yielding substance is varied. In all of these runs the organic material used was benzene which was introduced into the tube in a dish. The control run did not have any inhibitor, while various concentrations of tetraethyl lead were used in the other runs to determine its effect on polymer formation inhibition. Except for the TEL concentration, each of the runs was effected for 2 hours under the conditions described above with reference to the runs in Example I.

In this connection, it must be noted that it was found that, at room temperature the volatility of TEL is about 0.006 gram per liter of atmosphere (i.e., 6 p.p.m.). Therefore, a 1% solution of tetraethyl lead in benzene at equilibrium, produces a nearly saturated benzene atmosphere with about 0.06 p.p.m. of tetraethyl lead.

The effect of the tetraethyl lead concentration on the amount of frictional organic polymer produced is summarized in the following table.

| Inhibitor in benzene: | Organic frictional polymer |
|---|---|
| None | 10 |
| 0.05 | 9.5 |
| 0.1 | 9 |
| 0.5 | 8.5 |
| 10 | 0 |

The results presented above clearly establish the advantages obtained when using the process of the present invention; there is a sharp decrease in the amount of this polymer formed at TEL concentration of about 0.5%.

*Example III*

The above-outlined apparatus was used to conduct a group of runs in which organic vapors from the following pure compounds were used as the sources of the frictional polymers: limonene, ethyl benzene, and cyclohexane, these runs being first conducted in the absence and then in the presence of TEL as the polymer inhibiting agent. The inhibitor effect of TEL was evaluated at a single concentration level, viz. that provided by the pure TEL liquid disposed in the tube used for the runs. It was found that the use of the tetraethyl lead decreased the quantity of the polymer formed, and that at least in the runs with ethylbenzene and cyclohexane the presence of TEL not only decreased the total quantity of deposit formed, but also decreased its frictional polymer content markedly.

*Example IV*

In still another series, runs were conducted along the lines set above under Example III. However, in these runs, instead of using vapors of pure materials, organic vapors of certain specified materials of relay construction were exposed (first in the absence and then in the presence of tetraethyl lead) to the rubbing palladium system described above in Example I. The three construction materials were: phenolic-paper laminate, formvar magnet wire and rosin flux. Just as in the case of the runs described in Example III, the presence of TEL vapor materially reduced the quantity of deposit obtained, and also decreased its frictional polymer content materially.

It was pointed out that the concentration of the subject inhibitor in the vapor space of a sealed relay or the like may vary within wide limits. Thus, it may be as low as 1 p.p.m. or range as high as the saturation point of the particular inhibitor under the operating conditions. This inhibitor concentration in the vapor space surrounding the subject rubbing contacts may be varied by various means and methods known to those skilled in the art.

I claim:

1. In a process for inhibiting frictional polymer formation in sealed electric contact devices in which electric contacts are at least coated with a metal of the platinum family, and in which said contacts repeatedly make and break an electric circuit, the step of providing the vapor space within said sealed electric contact device with a volatile organo-metallic compound capable of forming free radicals under the operating conditions existing within said sealed contact device.

2. The process according to claim 1, wherein the amount of the volatile organo-metallic compound employed is such that its concentration in the vapor space is between about 1 part per million and its saturation point under the operating conditions.

3. In a process for inhibiting frictional polymer formation in sealed electric contact devices in which electric contacts are of a metal of the platinum family, and in which said contacts repeatedly make and break an electric circuit, the step of introducing the vapor space surrounding said electric contacts a volatile organo-metallic compound capable of forming free radicals under the operating conditions existing within said sealed contact device.

4. The process according to claim 1, wherein the amount of the volatile organo-metallic compound employed is sufficient to saturate the vapor space surrounding the electric contact.

5. A process for inhibiting formation of a frictional organic polymer in sealed electric relays in which the contacts are at least coated with a metal of the platinum family, which comprises providing the vapor space within the sealed relay with a volatile organo-metallic compound capable of forming free radicals under the operating conditions existing within said sealed relay.

6. The process according to claim 5, wherein the organo-metallic compound used in tetraethyl lead.

7. The process according to claim 6, wherein the tetraethyl lead is employed in such an amount that its concentration in the vapor space is at least 1 part per million.

8. The process according to claim 6, wherein the amount of tetraethyl lead employed is such that its concentration in the vapor space is between about 1 part per million and its saturation point under the operating conditions.

No references cited.

KATHLEEN H. CLAFFY, *Primary Examiner.*

HERMAN O. JONES, *Assistant Examiner.*